Figure 1:
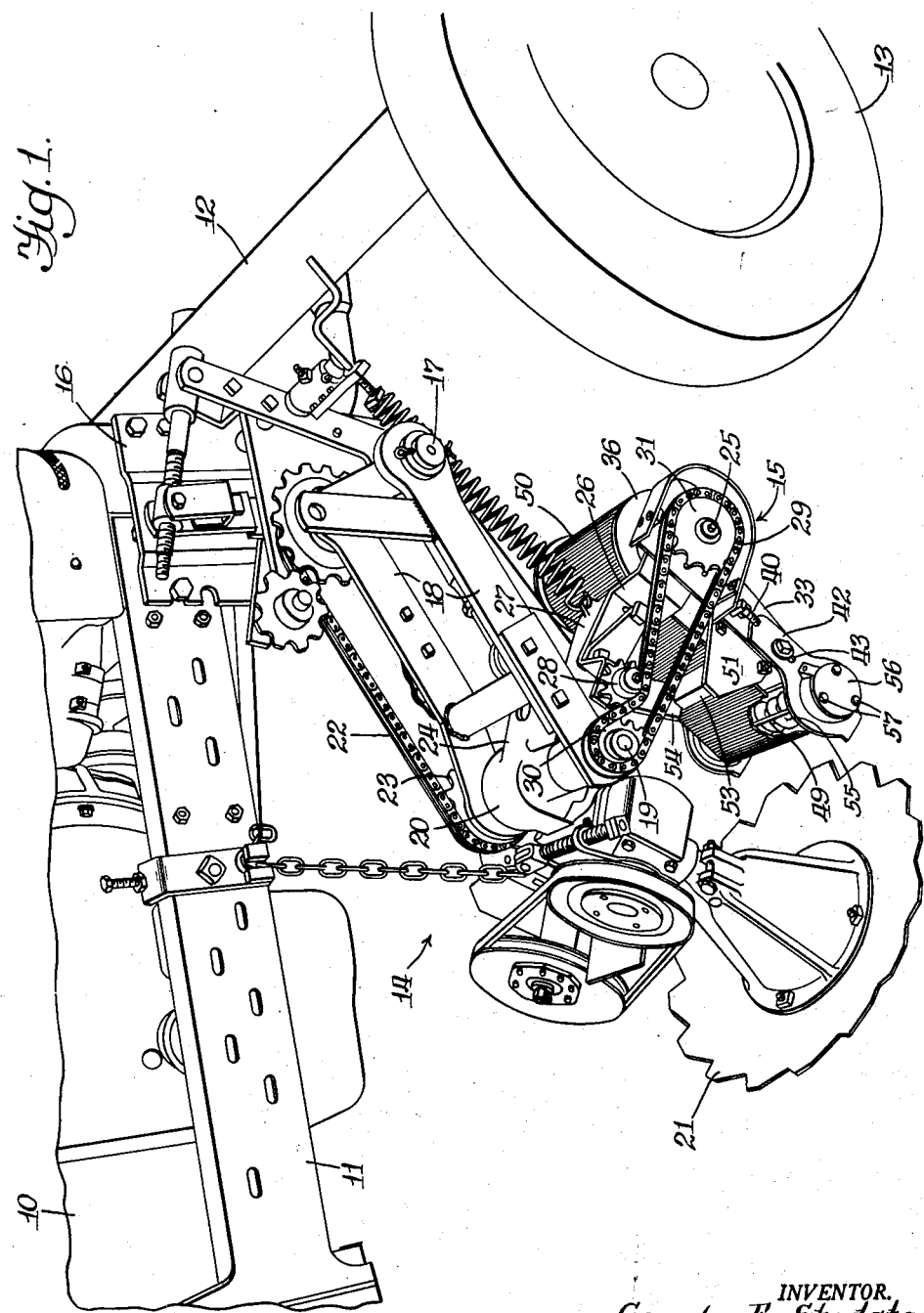

Oct. 6, 1953

G. E. STADSTAD 2,654,205

FINDER MECHANISM FOR BEET TOPPERS

Filed June 30, 1951

2 Sheets-Sheet 1

INVENTOR.
George E. Stadstad
BY Paul O. Pippel
Atty.

Oct. 6, 1953  G. E. STADSTAD  2,654,205
FINDER MECHANISM FOR BEET TOPPERS

Filed June 30, 1951  2 Sheets-Sheet 2

INVENTOR.
George E. Stadstad
BY Paul O. Pippel
Atty.

Patented Oct. 6, 1953

2,654,205

UNITED STATES PATENT OFFICE 2,654,205

FINDER MECHANISM FOR BEET TOPPERS

George E. Stadstad, Manvel, N. Dak., assignor to International Harvester Company, a corporation of New Jersey Application June 30, 1951, Serial No. 234,493

7 Claims. (Cl. 56—121.46)

This invention relates to agricultural implements and particularly to beet toppers. More specifically the invention concerns an improved beet finder or gauge construction for use with a beet topper.

The invention is particularly applicable to the driven or endless belt type of beet finder. Topping mechanism for beets and the like customarily includes a travelling support upon which is mounted a blade for severing the crown from beets and in advance thereof a finder adapted to engage the beets ahead of the cutting blade and to rise and fall with the variation in size of the beets so that the proper amount of crown may be severed by the cutting blade. The topping mechanism is therefore mounted for vertical floating movement upon the support. Since beet toppers are required to operate under soil conditions varying from dry to wet and from light to heavy clayey soils, the mechanism which engages the beets and the earth therebetween is subject to fouling particularly by damp soil. In the case of the driven type of finder such as that with which the present invention is concerned comprising an endless belt trained around rotating rollers or reels, the rollers or the roller in contact with the ground and the beet tops is likely to become clogged with sticky soil which gets under the belt and interferes with its operation.

An object of the present invention therefore is to provide an improved beet finder of the driven endless belt type which is capable of operating successfully in all soil conditions without the disruption of service and the frequent cleaning usually required of a device operating under such difficult conditions.

Another object of the invention is to provide an improved beet finder of the driven endless belt type wherein the accumulation of earth under the belt, with the consequent disruption of operation caused thereby, is inhibited.

Another object of the invention is to provide in a driven endless belt beet finder, reels or slatted rollers about which the endless belt is trained to provide an escape passage for dirt tending to accumulate under the travelling belt, and means for discharging the dirt which accumulates in the roller to prevent it building up to a point where it interferes with the operation of the finder unit.

A further object of the invention is to provide in an endless belt beet finder wherein the belt is trained around rotating reels, an auger within the reel held stationary so that dirt accumulating in the reels and under the belt may be discharged from the end of the auger.

Figure 2:
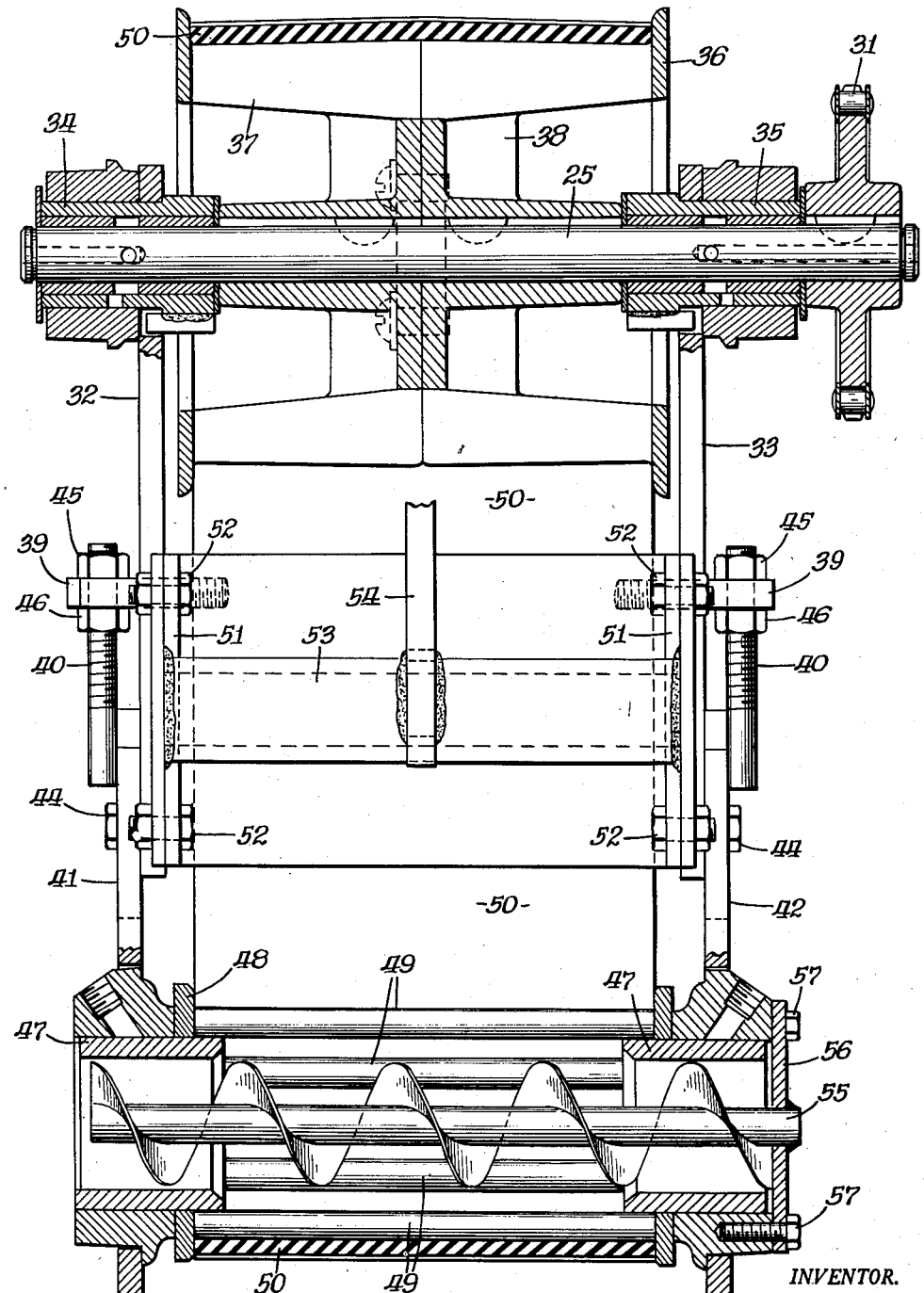

Other objects and advantages of the invention will become clear from the following detailed description when read in conjunction with the accompanying drawings, wherein:

Figure 1 is a view in perspective of a typical beet topping unit utilizing a driven beet finder or gauge embodying the features of the present invention; and Figure 2 is an enlarged fragmentary front elevation of the gauge mechanism with parts broken away and shown in section showing the details of construction of the beet finder of this invention.

Referring to the drawings, it will be observed that the beet topper incorporating the gauge mechanism of this invention is mounted upon the side of a tractor 10 having side sills 11, a front axle 12 and a pair of laterally spaced dirigible front wheels 13, only one of which is shown. The details of the beet topping unit, designated generally by the numeral 14, other than the beet gauge 15, form no part of this invention. Briefly, it may be noted that the topping unit is mounted upon a depending plate 16 secured to the side sill 11 of the tractor. This plate 16 supports among other elements a transversely extending shaft 17 upon which is pivotally mounted a pair of rearwardly and downwardly extending links 18 which support at their rear ends a transverse shaft 19 upon which is mounted a gear housing 20 which rotatably carries a shaft, not shown, upon the lower end of which is mounted the cutting disk 21. Suitable gearing of a conventional nature is provided in the housing 20 for transmitting motion between the shaft 19 and the disk 21. As indicated in Figure 1, shaft 19 is driven by a chain 22 trained around a sprocket wheel 23 on the shaft 19 and another sprocket wheel, not shown, mounted on the inner end of shaft 17. Shaft 17 may be driven in any suitable manner from the tractor power plant.

An arm 24 secured to the housing 20 and extending forwardly and downwardly therefrom serves as a support for one end of a transversely extending shaft 25, the other end of which is rotatably carried in an angle bracket 26 which is secured by suitable bolts to an arm 27 affixed to one of the links 18 and depending therefrom. Bracket 26 also carries an idler roller 28 which engages a chain 29 drivingly connecting a sprocket wheel 30 mounted upon the shaft 19 and another sprocket wheel 31 mounted upon the shaft 25. Shaft 25 is thus driven from the same source as the cutting disk 21.

Likewise mounted upon the shaft 25 is a frame for the endless belt beet finder comprising laterally spaced frame members 32 and 33. These frame members 32 and 33 are respectively mounted upon bearings 34 and 35 rotatably carried on the shaft 25 adjacent the ends thereof. Likewise mounted upon these bearings 34 and 35 are the ends of a guide roller or reel 36 comprising circumferentially spaced slats 37 mounted upon a hub 38 keyed to the shaft 25. Since the shaft 25 is driven by the connection of chain 29 to sprocket wheel 31, the reel 36 is driven therewith.

The frame members 32 and 33 are each provided with an eye-bolt 39 which is apertured to receive the threaded end of another bolt 40 which is affixed as by welding to another pair of frame members 41 and 42 which are connected to the respective frame members 32 and 33 by means of the reception of bolts 40 in eye-bolts 39. A slot 43 is also provided in each of the frame members 41 and 42 to receive a bolt 44 slidable in the slot. Thus the frame parts 32, 33 and 41, 42 may be lengthened or shortened by adjusting the bolts 40 in the eye-bolts 39. Nuts 45 and 46 are provided to adjust the position of bolts 40 with respect to eye-bolts 39, the purpose of this adjustment becoming clear hereinafter.

The rearwardly extending ends of the frame parts 41 and 42 are enlarged and apertured to receive sleeves 47 which serve as a bearing surface for the opposite ends of a slatted guide roller or reel 48 comprising circumferentially spaced rods or slats 49 having spaces therebetween as indicated in the drawings. The rollers 36 and 48 serve as guides for an endless belt 50 trained therearound. The endless belt 50, made of corrugated rubber or the like is trained around the guide rollers or reels 36 and 48 and may be tightened or loosened by the adjustment of the bolts 40. The reel 48 is freely rotatable upon the bearings 47 and is driven by its engagement with the belt 50 which in turn is driven through the operation of the shaft 25 and reel or guide 36.

The frame of the finder 15 is braced by the provision of a vertically extending plate 51 secured to each of the frame parts 33 by bolts 52 and extending upwardly therefrom. The plates 51 at opposite sides of the frame are connected by a bridge 53 which is in turn connected by an arm 54 with the bracket 26.

As pointed out before, dirt accumulates in the reel 48, which is the end of the beet finder normally in engagement with the ground and with the tops of the beets. This accumulation of dirt, of course, fouls the finder and interferes with the operation of the endless belt 50. Dirt getting under the belt 50 between the belt and the guide or roller 48 passes into the interior of the roller and accumulates there. Means therefore must be provided for discharging this dirt; otherwise it will build up under the belt. In order to overcome the tendency of this dirt to accumulate and to discharge the dirt from the finder unit, applicant has discovered that an auger 55 mounted axially within the guide or reel 48 and held stationary therein causes the dirt to be pressed into the convolutions thereof during the rotation of the reel 48 and to move toward one end thereof. One end of the reel 48 and the bearing 47 is therefore left open to the outside, whereas the other end adjacent the frame part 42 is provided with a closure or cap 56 secured by bolts 57 to the enlarged end of the member 42. One end of the auger 55 is affixed by welding to the closure 56 in a cantilever suspension construction, the free end of the auger extending axially through the reel 48 and terminating adjacent the open end of the reel at the frame member 41. The cantilever stationary auger 55 thus is held stationary by being affixed at one end to the frame. The auger is readily removable from the reel 48 by withdrawing the bolts 57, and may be easily replaced or cleaned if desired.

It is believed that the operation of the stationary auger for beet finders to prevent accumulation of dirt therein will be clearly understood from the foregoing description. However, it should also be understood that modifications may be made in the invention without departing from the spirit thereof or the scope of the appended claims.

What is claimed is:

1. In a driven finder for beets and the like adapted to travel upon the surface of the ground and to engage the growing crop, a supporting frame, a pair of spaced rollers rotatably carried by the frame, an endless belt trained on said rollers, at least one of said rollers comprising circumferentially spaced belt-engaging slats, and a stationary auger carried by said frame and extending axially through said latter roller.

2. In a driven finder for beets and the like adapted to travel upon the surface of the ground and to engage the growing crop, a supporting frame, a pair of spaced rollers rotatably carried by the frame, an endless belt trained on said rollers, at least one of said rollers comprising circumferentially spaced belt-engaging slats, and a cantilever auger-shaped member carried by the frame and extending axially through said roller.

3. A driven endless belt assembly comprising a supporting frame, a driven shaft rotatably mounted on the frame, a belt-guide mounted on the shaft, a second guide spaced from and parallel to the first guide and rotatably mounted for free rotation on the frame, an endless belt trained on said guides and arranged to transmit rotary motion from the first to the second guide to drive the latter, and a non-rotatable auger-shaped member within and extending axially of said second guide.

4. A driven endless belt assembly comprising a supporting frame, a driven shaft rotatably mounted on the frame, a belt guide mounted on the shaft, a second guide spaced from and parallel to the first guide and rotatably mounted for free rotation on the frame, an endless belt trained on said guides and arranged to transmit rotary motion from the first to the second guide to drive the latter, said second guide having an axial opening formed therein and extending therethrough, a stationary closure at one end of said guide, and an auger-shaped member in said opening and secured at one end to said closure.

5. In a driven finder for beets and the like adapted to travel upon the surface of the ground and engage the growing crop, a supporting frame, a pair of parallel spaced apart reels carried by the frame, an endless belt trained on said reels, an auger extending axially through one of said reels, and means for non-rotatably supporting said auger on the frame.

6. In a driven finder for beets and the like adapted to travel upon the surface of the ground and engage the growing crop, a supporting frame, a driven shaft carried at one end of the frame and having a belt guide mounted thereon, a pair of aligned bearings carried by said frame spaced from said shaft, a slatted reel extending between said bearings and having its ends rotatably mounted thereon, an endless belt trained on said belt guide and reel, an auger extending axially through said bearings and said reel, and means for non-rotatably securing said auger to the frame, whereby the auger remains stationary while the reel revolves.

7. In a driven finder for beets and the like adapted to travel upon the surface of the ground and engage the growing crop, a supporting frame, a driven shaft carried at one end of the frame and having a belt guide mounted thereon, a pair of aligned bearings carried by said frame spaced from said shaft, a slatted reel extending between said bearings and having its ends rotatably mounted thereon, an endless belt trained on said belt guide and reel, a cantilever auger extending axially through said bearings and said reel, and means for non-rotatably securing one end of said auger to the frame.

GEORGE E. STADSTAD.

References Cited in the file of this patent

UNITED STATES PATENTS

| Number | Name | Date |
|---|---|---|
| 1,454,501 | Anderson | May 8, 1923 |
| 2,468,994 | Moreau | May 3, 1949 |
| 2,488,735 | Orendorff | Nov. 22, 1949 |